Patented May 12, 1942

2,282,948

UNITED STATES PATENT OFFICE 2,282,948

SOLUTION OF SULPHUR-CONTAINING ORGANIC CONDENSATION PRODUCTS

Otto Ewald Dietzel, Castrop-Rauxel, Germany, assignor to the firm: Rutgerswerke-Aktiengesellschaft, Berlin, Germany No Drawing. Application January 23, 1939, Serial No. 252,509. In Germany January 25, 1938

2 Claims. (Cl. 260—32)

This invention relates to solutions of sulphur-containing condensation products of high molecular weight, to the use of such solutions for purifying and recovering said condensation products, and to a method of impregnating and coating materials with said solutions.

It is known in the art that sulphur-containing condensation products of high molecular weight may be obtained by the reaction of a water-soluble inorganic polysulphide with organic compounds having replaceable negative groups or by the action of molten sulphur on olefin hydrocarbons. Such condensation products resemble rubber, but are distinguished from rubber by their insolubility in mineral oils and other organic liquids. Owing to their remarkable resistance to organic substances, these condensation products have found a great number of important uses. They are known, for example, under the tradename of "Thiokol."

Owing to their resistance to organic solvents, it has not been possible hitherto to obtain clear solutions of these condensation products without essentially affecting their chemical structure.

I have now discovered that clear solutions can be obtained without essential chemical change by treating the sulphur-containing condensation products of high molecular weight with an aliphatic or aromatic organic base, for instance, diethanol amine, pyridine, piperidine, chinolin, aniline etc. These substances may be used as pure compounds, or as mixtures of several bases or in the form of mixtures of one or more bases with other suitable substances. Thus, for instance, crude or purified mixtures of organic bases, which have been obtained from coal tar, brown coal tar, or other carbonization tars, may be used. Low-boiling as well as high-boiling bases or mixtures of such bases may be used for carrying out my invention, for instance fractions boiling between 200° and 250° C. or between 380° and 420° C. The bases used for the dissolution of the condensation products may contain certain amounts of hydrocarbons. Tar oils which are rich in organic bases, may for instance, be used. Generally speaking, the dissolving capacity of the bases increases with an increase in their boiling points. The choice of the base, which is used for the preparation of a solution according to my present invention, also depends on the use of the solution obtained, inasmuch as the lower the boiling point of the solvent be, the easier it is to separate it from the dissolved condensation product.

The bases used as solvents may contain some constituents or impurities which react with sulphur or sulphur-containing substances. Such bases may preferably be subjected to a preliminary treatment by heating them with sulphur and distilling them thereafter in order to render the solvent resistant towards sulphur or sulphur-containing substances, and to avoid a reaction between the solvent and the sulphur-containing condensation product.

The sulphur-containing condensation products may be treated with solvents in the form of crude condensation products, as well as intermediate or finished products which have been obtained by molding or hardening, and also in the form of scrapped or waste material consisting of or containing the condensation products. By treating these materials with organic bases, the condensation products are dissolved, and fillers or other admixtures are obtained as an undissolved residue.

In order to obtain solutions of the sulphur-containing condensation products, the material to be dissolved is preferably first subjected to mastication and comminution, and then mixed with the bases under heating and stirring until a solution is obtained. The condensation products swell and then go gradually into solution at ordinary room temperature, for instance 20° C. I prefer however to facilitate the solution by heating. I have found that generally temperatures between 50° and 120° C. are most suitable for obtaining solutions of the condensation products. At these temperatures the sulphur-containing condensation products can easily be dissolved without causing any essential or undesired change in their chemical structure. At higher temperatures a chemical reaction may occur between the sulphur-containing condensation products and certain solvents.

The solutions obtained are, according to their concentration, stable, more or less viscous liquids, which may be separated from the undissolved residue by filtration.

The sulphur-containing condensation products may be recovered from the solutions thus obtained in various ways. The solvent may, for instance, be removed by evaporation at ordinary or elevated temperatures, whereby the dissolved condensation product is obtained as a soft residue which becomes solid and elastic. If a water-soluble base, such as pyridin, has been used as a solvent, the separation of the dissolved substance from the solvent may be effected by pouring the solution into water. Thereby an emulsion of the condensation product in water is formed, and this emulsion can be coagulated by the addition of an acid. I prefer to pour the solution into diluted aqueous acid, for instance diluted hydrochloric acid. The condensation product is then precipitated and coagulated and the bases are dissolved in the acid and thus separated from the condensation product. The solvent may also be separated from the dissolved condensation product by distillation, preferably vacuum distillation or by means of steam. It has been found that it is preferable in some cases, particularly where bases having high boiling points, for instance about 400° C. have been used, to retain a certain portion of these bases in the condensation products. I have found that such bases may be used as valuable softening agents in the sulphur-containing condensation products. The coagulated condensation products may be further purified, for instance by means of hot diluted mineral acids, by washing with water or by drying under a vacuum.

Thus, the dissolution of the sulphur-containing condensation products according to my present invention, and their separation from the solvent, can be used for purifying said condensation products and for the recovery of said condensation products in a valuable form, from mixtures or articles of any kind, which contain such condensation products.

Example 1.—One part by weight of a solid plastic condensation product obtained from ethylene chloride and a water-soluble inorganic polysulphide is comminuted, and then mixed and heated under stirring with 2-10 parts by weight of chinoline to about 50°-120° C. until a clear solution is obtained. The condensation product can be separated from the solvent by pouring the solution into diluted, aqueous hydrochloric acid, whereby a soft precipitate is obtained which shows a high elasticity after drying.

The condensation product can be obtained in a manner known per se, for instance, by reacting 1 kilogram of ethylene chloride at about 70° C. with an aqueous solution of 1.740 kilograms of sodium tetrasulphide in the presence of 60 grams of freshly precipitated magnesium hydroxide. A sodium tetrasulphide solution having a specific gravity of 1.2 to 1.3 may be used. The ethylene dichloride is preferably added in small proportions with vigorous agitation and the condensation product is formed as a fluid dispersion which settles out of the reaction mixture. The suspension obtained is washed out, and is coagulated with acid in a known manner.

Example 2.—An olefin-polysulphide plastic obtained by condensing dichloro-ether and sodium tetrasulphide in a known manner, is mixed with lampblack, molded and hardened to a finished product. The finished product thus obtained is comminuted, and 1 part by weight of the comminuted material is mixed and heated under stirring with 10 parts of pyridine, which is free from water, until the condensation product is dissolved. The undissolved lampblack is separated from the solution by filtration. The condensation product can be recovered by pouring the solution into water or diluted, mineral acid, and is thereby obtained as a soft product which forms an elastic mass after drying.

Example 3.—One part by weight of a finished product which contains an olefin-polysulphide plastic obtained in a known manner from ethylene chloride and a soluble, inorganic polysulphide, is pulverized and mixed with 2 parts by weight of a mixture of organic bases which boils at 380°-420° C. and has been obtained from coal-tar distillates. The mixture is heated with stirring to 80°-100° C. until the condensation product is dissolved. A clear solution, which is gelatinous at ordinary temperature, can be obtained by filtration. The dissolved condensation product can be separated from the solvent by pouring the solution into a diluted mineral acid.

Example 4.—A sulphur-containing condensation product is prepared in a known manner by the action of sulphur on ethylene under heat and pressure. One part by weight of the pulverized condensation product is heated with 10 parts by weight of pyridine to about 110° C. and dissolved with stirring. The condensation product may be precipitated and recovered in the form of an elastic mass by pouring the solution into acetic acid.

Example 5.—One part by weight of an olefin-polysulphide plastic obtained in a known manner from ethylene chloride and a water-soluble inorganic polysulphide, such as sodium tetrasulphide, is gradually mixed and heated to about 110° C., in a finely pulverized condition, with a coal-tar distillate boiling at about 110°-140° C. and containing about 50% of organic bases until the condensation product is dissolved. The dissolved substance may be recovered by distilling off the solvent with steam.

Instead of the solvents mentioned in the above examples diethanol amine, piperidine, aniline, or their mixtures, or mixtures of these substances with other organic bases or with suitable amounts of hydrocarbons, such as coal-tar distillates, may be used in a similar manner.

I have further found that the solutions of sulphur-containing condensation products obtained according to my present invention may preferably be used for impregnating and coating purposes instead of suspensions or emulsions which have been hitherto used for said purposes.

The use of clear and homogeneous solutions instead of suspensions, offers the advantages of thoroughly and uniformly penetrating the material to be treated. The difficulties, which have been encountered in the use of suspensions or emulsions on account of the irregular distribution of the coating or impregnating substance or on account of a separation of the dispersion by fine-pored materials, can be entirely avoided by the use of solutions according to my invention. Furthermore, surface coatings obtained by means of such solutions are much more homogeneous and coherent than those obtained from the known emulsions or suspensions.

In addition, the use of solutions according to my invention makes it possible to mix homogeneously other materials, which are soluble in organic bases, with the sulphur containing condensation products, and to distribute perfectly and homogeneously such additions in the coatings or impregnations which are obtained by removing the solvents from said solutions. Suitable amounts of rubber may, for instance, be dissolved in the solution of the sulphur-containing condensation product in organic bases. By applying such solutions as coating or impregnating liquids, and then removing the solvents, coatings, films or the like can be obtained which contain a perfectly homogeneous mixture of the sulphur-containing condensation product and rubber. Other substances, such as artificial resins, hardening agents, or the like, which are soluble in organic bases, may also be added to the solution.

The solvent can be removed from the coated or impregnated material by evaporation at ordinary or elevated temperature.

By the term "sulphur containing organic condensation product" as used in the present specification and claims, is meant a condensation product of high molecular weight which is obtained by reacting soluble inorganic polysulphides, such as polysulphides of alkaline metals, alkaline-earth metals or ammonium, with an organic compound having replaceable negative groups. Such organic compounds are, for instance, dihalogenated aliphatic hydrocarbons, mixed aromatic hydrocarbons having at least two halogen atoms in side chains, dihalogenated ethers, ethyl-dithio-sulphuric acids, ethyldimercaptans. Said term "sulphur-containing condensation product" also includes products obtained by the action of molten sulphur on olefin hydrocarbons.

The term "organic base" as used in the present specification and claims, includes aliphatic and aromatic organic bases, such as diethanol amine, pyridine, piperidine, chinoline, aniline in crude or pure state, as well as mixtures of several of these bases or mixtures of one or more organic bases with other substances, such as tar distillates containing sufficient amounts of organic bases.

I claim:

1. The method of preparing a solution of an olefin-polysulphide plastic, said method comprising dissolving said olefin-polysulphide plastic in a solvent which is selected from the group consisting of pyridine, piperidine and chinoline, and has been subjected to a preliminary treatment by heating it with sulphur and subsequent distillation.

2. The method of preparing a solution of an olefin-polysulphide plastic, said method comprising dissolving said olefin-polysulphide plastic in a liquid containing a solvent which is selected from the group consisting of pyridine, piperidine and chinoline, and has been subjected to a preliminary treatment by heating it with sulphur and subsequent distillation.

OTTO EWALD DIETZEL.